(12) United States Patent
Kondo et al.

(10) Patent No.: US 8,417,099 B2
(45) Date of Patent: Apr. 9, 2013

(54) MULTIPLEXING METHOD AND RECORDING MEDIUM

(75) Inventors: Satoshi Kondo, Kyoto (JP); Tadamasa Toma, Osaka (JP); Katsuhiro Kanamori, Nara (JP); Haruo Yamashita, Osaka (JP); Takeshi Ito, Osaka (JP); Jun Ikeda, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/064,793

(22) PCT Filed: Aug. 11, 2006

(86) PCT No.: PCT/JP2006/315946
§ 371 (c)(1),
(2), (4) Date: Feb. 25, 2008

(87) PCT Pub. No.: WO2007/023698
PCT Pub. Date: Mar. 1, 2007

(65) Prior Publication Data
US 2009/0116819 A1 May 7, 2009

(30) Foreign Application Priority Data
Aug. 26, 2005 (JP) ................................. 2005-245567

(51) Int. Cl.
*H04N 9/79* (2006.01)
(52) U.S. Cl.
USPC ........... 386/326; 386/239; 386/248; 386/314; 386/353
(58) Field of Classification Search ................... 386/248, 386/356, 337
See application file for complete search history.

(56) References Cited

U.S. PATENT DOCUMENTS

| 6,335,761 B1 | 1/2002 | Glen et al. |
| 6,477,318 B2 | 11/2002 | Ishii |
| 6,594,444 B2 | 7/2003 | Lee |

(Continued)

FOREIGN PATENT DOCUMENTS

| EP | 0 845 902 | 6/1998 |
| EP | 1 424 854 | 6/2004 |

(Continued)

OTHER PUBLICATIONS

International Search Report issued Nov. 21, 2006 in the International (PCT) Application of which the present application is the U.S. National Stage.

(Continued)

*Primary Examiner* — Kambiz Zand
*Assistant Examiner* — Imhotep Durham
(74) *Attorney, Agent, or Firm* — Wenderoth, Lind & Ponack, L.L.P.

(57) ABSTRACT

To provide a multiplexing method which facilitates a reproduction process and reduces unpleasantness felt by a viewer about image quality.
The multiplexing method includes: a step of judging whether or not a clip to be coded should be coded as part of a continuous reproduction unit in which bitstreams are structured so as to allow continuous reproduction (S100); a step of determining a color space that is common within the continuous reproduction unit when it is judged that the clip should be coded as part of the continuous reproduction unit (S110); a step of generating bitstreams by coding the clip to be coded according to a determined color space (S112); and a step of packet-multiplexing bitstreams (S118).

16 Claims, 7 Drawing Sheets

U.S. PATENT DOCUMENTS

| | | | |
|---|---|---|---|
| 6,856,759 B1 * | 2/2005 | Fukuda et al. | 386/242 |
| 7,565,060 B2 | 7/2009 | Hamada et al. | |
| 2001/0022887 A1 | 9/2001 | Lee | |
| 2002/0044756 A1 | 4/2002 | Ishii | |
| 2004/0075754 A1 * | 4/2004 | Nakajima et al. | 348/231.6 |
| 2004/0190878 A1 | 9/2004 | Shibutani | |
| 2005/0206784 A1 * | 9/2005 | Li et al. | 348/441 |
| 2005/0254363 A1 | 11/2005 | Hamada et al. | |
| 2006/0110131 A1 | 5/2006 | Okauchi et al. | |
| 2007/0172210 A1 | 7/2007 | Hamada et al. | |
| 2007/0183750 A1 | 8/2007 | Hamada et al. | |
| 2007/0183754 A1 | 8/2007 | Hamada et al. | |
| 2007/0189722 A1 | 8/2007 | Hamada et al. | |
| 2007/0189727 A1 | 8/2007 | Hamada et al. | |

FOREIGN PATENT DOCUMENTS

| | | |
|---|---|---|
| JP | 10-191388 | 7/1998 |
| JP | 2004-186718 | 7/2004 |
| JP | 2004-328450 | 11/2004 |
| WO | 2004/036908 | 4/2004 |

OTHER PUBLICATIONS

ISO/IEC13818-2, "*Information Technology—Generic Coding of Moving Pictures and Associated Audio Information: Video*", Second Edition, Dec. 2000.

ISO/IEC14496-10, "*Information Technology—Generic Coding of Audio-Visual Objects*", First Edition, Dec. 2003.

Extended European Search Report (in English language) dated May 20, 2011 in corresponding European Patent Application No. 06796384.3.

* cited by examiner

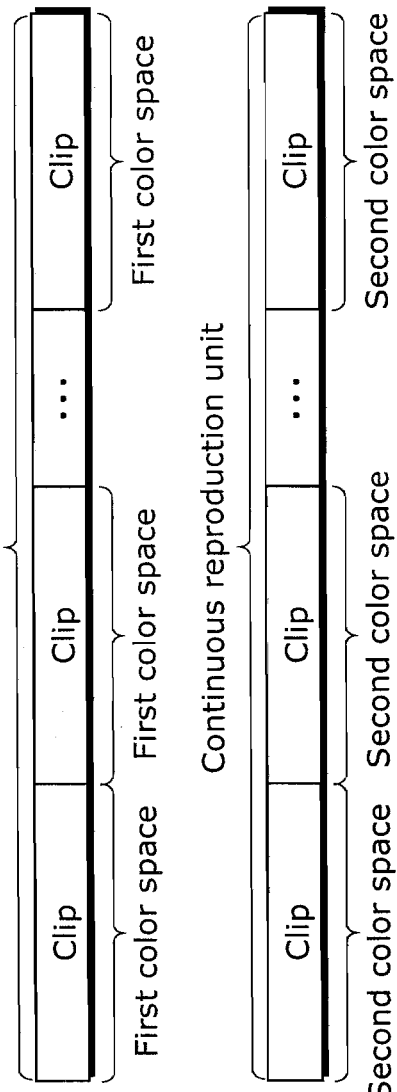
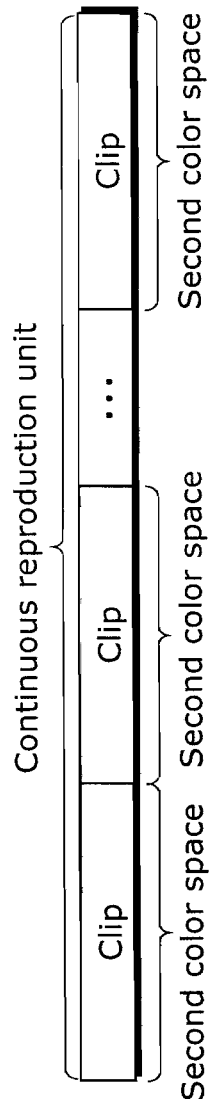
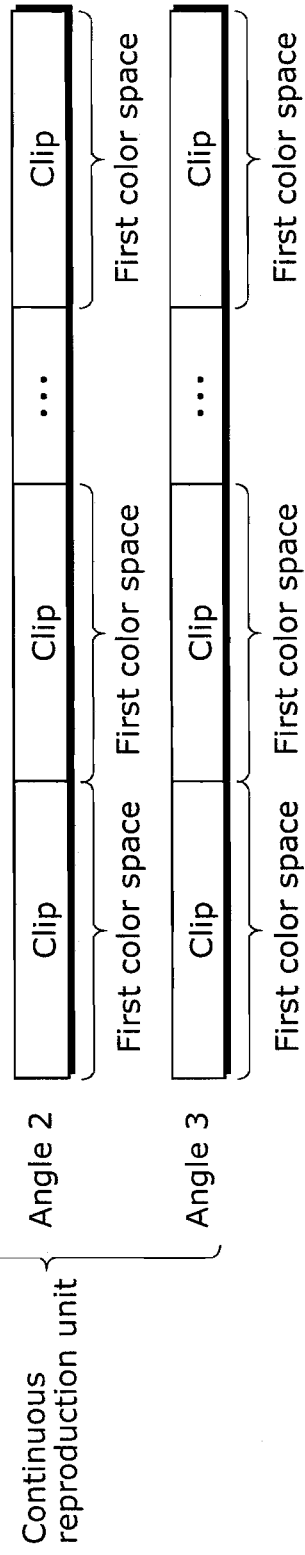
FIG. 2A
FIG. 2B
FIG. 2C

MULTIPLEXING METHOD AND RECORDING MEDIUM

TECHNICAL FIELD

The present invention relates to a multiplexing method for multiplexing bitstreams generated by coding a moving picture and including information regarding color spaces, and to a recording medium on which the multiplexed bitstreams are recorded.

BACKGROUND ART

In the MPEG-2 standard, which is an international standard system for moving picture coding, it is possible to describe information regarding color spaces of a moving picture signal (hereinafter, referred to as color space information) in a sequence display extension unit (Non-patent Reference 1). In addition, in the MPEG-4AVC standard, it is possible to describe the color space information in a video usability information unit within a sequence parameter set (Non-patent Reference 2). Here, the color space information represents, for example, colour_primaries (color primaries), transfer_characteristics (photoelectric conversion characteristics), and matrix_coefficients (conversion matrices from RGB into YUV), and for each of these, one type of color space information is selected from among several predetermined types (approximately six to nine types) and described.

On the other hand, for DVD-Video discs, MPEG-2 is adopted as a method for coding video pictures. Here, restrictions are provided for the color space information (Non-patent Reference 3). For example, two types of values are set as default values (in the case where the frame rate is 29.97 Hz) with respect to each of the colour_primaries, transfer_characteristics, and matrix_coefficients that are color space information.

Furthermore, in recent years, the development of displays, whose expressible color spaces are significantly wider than ever (wide color-gamut displays), has been actively undertaken. Responding to this, IEC TC100 has been promoting the standardization of the xvYCC color space as IEC61966-2-4. When comparing the xvYCC color space with conventional color spaces, the expressible color space has been expanded by approximately 100 percent as compared to the sRGB color space, and by approximately 5 percent as compared to the sYCC color space.

As for the conventional DVD-Video discs as described above, it is possible to record, on an identical medium, a moving-picture sequence having color spaces that are different in DVD-Video standards. Furthermore, no restrictions are provided for reproducing the medium on which a mixture of moving picture sequences having such different color spaces are recorded. However, the values set as default values have not been of a practical problem so far since differences between defined color spaces are small.

Non-patent Reference 1: ISO/IEC13818-2: Information technology Generic coding of moving pictures and associated audio information: Video, Second edition, 2000 December.
Non-patent Reference 2: ISO/IEC14496-10: Information technology Coding of audio-visual objects Part10: Advanced video coding, First edition, 2003 December.
Non-patent Reference 3: DVD Specifications for Read-Only Disc, Part 3. Video Specifications Version 1.0, August 1996

DISCLOSURE OF INVENTION

Problems that Invention is to Solve

However, when reproducing a moving-picture sequence coded and multiplexed in the conventional multiplexing method, there are problems that the reproduction process becomes complicated, and that viewers are made to have discomfort about the subjective image quality of the reproduced moving picture.

In other words, when considering the recent progress in the development of wide-color-gamut displays, it is anticipated that color spaces (such as the xvYCC color space) that are largely different from the color spaces having been defined to date, will be newly added in future to the standards for the media like DVD-Videos and BD-ROMs. If this is the case, color spaces may be largely different among moving picture sequences recorded on an identical medium, and this is anticipated to be a practical problem. As a result, for example, assume the case where a moving picture signal in the YUV format, which is obtained by decoding a moving picture having been coded by MPEG-2 system or MPEG-4AVC system, is converted into a moving picture signal in the RGB format: the above-described problems, such as the complicated reproduction process and the discomfort felt about the subjective image quality, occur at moments of switching when reproducing a moving picture having different color space definitions like this. That is, the processing method (color conversion method) for the color conversion process (converting from the YUV format into the RGB format) needs to be instantaneously changed, and this makes the reproduction process complicated. Furthermore, at moments when such moving picture sequences are switched, users are made to have discomfort about image quality due to the color space difference between the preceding and the succeeding moving picture sequences.

Thus, the present invention is conceived in view of the problems, and has an object to provide a multiplexing method for facilitating the reproduction process and also reducing discomfort felt by a viewer about image quality.

Means to Solve the Problems

In order to achieve the object, the multiplexing method according to the present invention is a multiplexing method for generating bitstreams by coding a moving picture on a basis of a constituent unit of the moving picture, and packet-multiplexing the bitstreams, and the multiplexing method includes: judging whether or not the constituent unit to be coded should be coded as part of a continuous reproduction unit in which bitstreams are structured so as to allow continuous reproduction; determining, for the constituent unit to be coded, a color space that is common within the continuous reproduction unit, when it is judged that the constituent unit to be coded should be coded as part of the continuous reproduction unit; generating bitstreams by coding the constituent unit to be coded according to the determined color space; and packet-multiplexing the bitstreams.

In the case where the color spaces of the bitstreams are different from one another when reproducing bitstreams that are seamlessly connected, a reproducing apparatus must change the color conversion method with respect to the bitstreams having different color spaces. In other words, the reproducing apparatus performs color conversion process in which a decoded moving picture in the YUV format, generated by decoding the bitstreams, is converted into a decoded moving picture in the RGB format so as to be shown on a display. Here, in the case where the color spaces of the bitstreams are different from one another, the reproducing apparatus needs to change color conversion methods by switching the parameter used for the color conversion processing. In the same manner as above, in the case where the color spaces of the bitstreams are different from one another when continuously reproducing, by switching angles, bitstreams that are structured for allowing multi-angle reproduction, the reproducing apparatus must change the color conversion method with respect to the bitstreams of different color spaces.

Thus, in the present invention, since each constituent unit that is a clip to be coded as part of the continuous reproduction unit is coded according to the color space that is common within the continuous reproduction unit, color spaces are uniform within the continuous reproduction unit that is structured by seamless connection, or within the continuous reproduction unit that is structured so as to allow multi-angle reproduction. That is, the color spaces are fixed on the basis of each continuous reproduction unit. Therefore, the reproducing apparatus can eliminate the process of changing color conversion methods, thereby facilitating the reproduction process. Furthermore, since the color space is fixed, the discomfort, which is felt by a viewer about image quality, can be reduced.

In addition, the multiplexing method may further include generating a flag indicating whether or not color spaces are uniform within the continuous reproduction unit.

With this, when the flag is recorded on the recording medium together with packet-multiplexed streams (the continuous reproduction unit), the reproducing apparatus can easily judge, based on the flag, whether or not the color spaces are uniform within the continuous reproduction unit, and the processing load can be further reduced.

In addition, the multiplexing method may further record, on a recording medium, the bitstreams that have been packet-multiplexed, and in the generating of a flag, a flag may be generated which indicates whether or not the color spaces of all the bitstreams recorded on the recording medium are of only one type. Alternatively, the multiplexing method may further record, on a recording medium, the bitstreams that have been packet-multiplexed, and, in the generating of a flag, the flag may be generated which indicates whether or not the color spaces of all the bitstreams recorded on the recording medium are narrow color-gamut spaces only.

With this, when reproducing the moving picture represented by the bitstreams that are recorded on the recording medium, the reproducing apparatus can easily judge, based on the flag, whether or not the color conversion method should be changed for the recording medium, and the processing load can be further reduced.

Note that the present invention can be realized not only as a multiplexing method like this, but also as a multiplexing apparatus and an integrated circuit which perform multiplexing using the method, a program which causes the multiplexing apparatus to operate, and a recoding apparatus, which records the bitstreams packet-multiplexed by the multiplexing apparatus, on a recording medium. Furthermore, the present invention can also be realized as: a recording medium on which the bitstreams are recorded by the recording apparatus; a reproducing method with which to reproduce a moving picture represented by the bitstreams on the recording medium; a reproducing apparatus and an integrated circuit which reproduce the moving picture using the method; and a program which causes the reproducing apparatus to operate.

Effects of the Invention

With the multiplexing method according to the present invention, since, for example, the color space for a moving picture to be reproduced is determined to be of only one type (the color space is fixed) on a predetermined basis such as a continuous reproduction unit, it is possible to eliminate the frequent switching of color conversion methods caused by the switching of color space definitions. As a result, it is possible to reduce the processing load, on the apparatus, of package media in which moving picture sequences having different color spaces are recorded on an identical medium, as well as eliminate the discomfort about subjective image quality caused by the switching of color space definitions. Thus, the practical value of the multiplexing method according to the present invention is high.

BRIEF DESCRIPTION OF DRAWINGS

FIG. 2A is a diagram showing a continuous reproduction unit in the first embodiment of the present invention.

FIG. 2B is a diagram showing another continuous reproduction unit in the first embodiment of the present invention.

FIG. 2C is yet another diagram showing a continuous reproduction unit in the first embodiment of the present invention.

NUMERICAL REFERENCES

Figure 1:
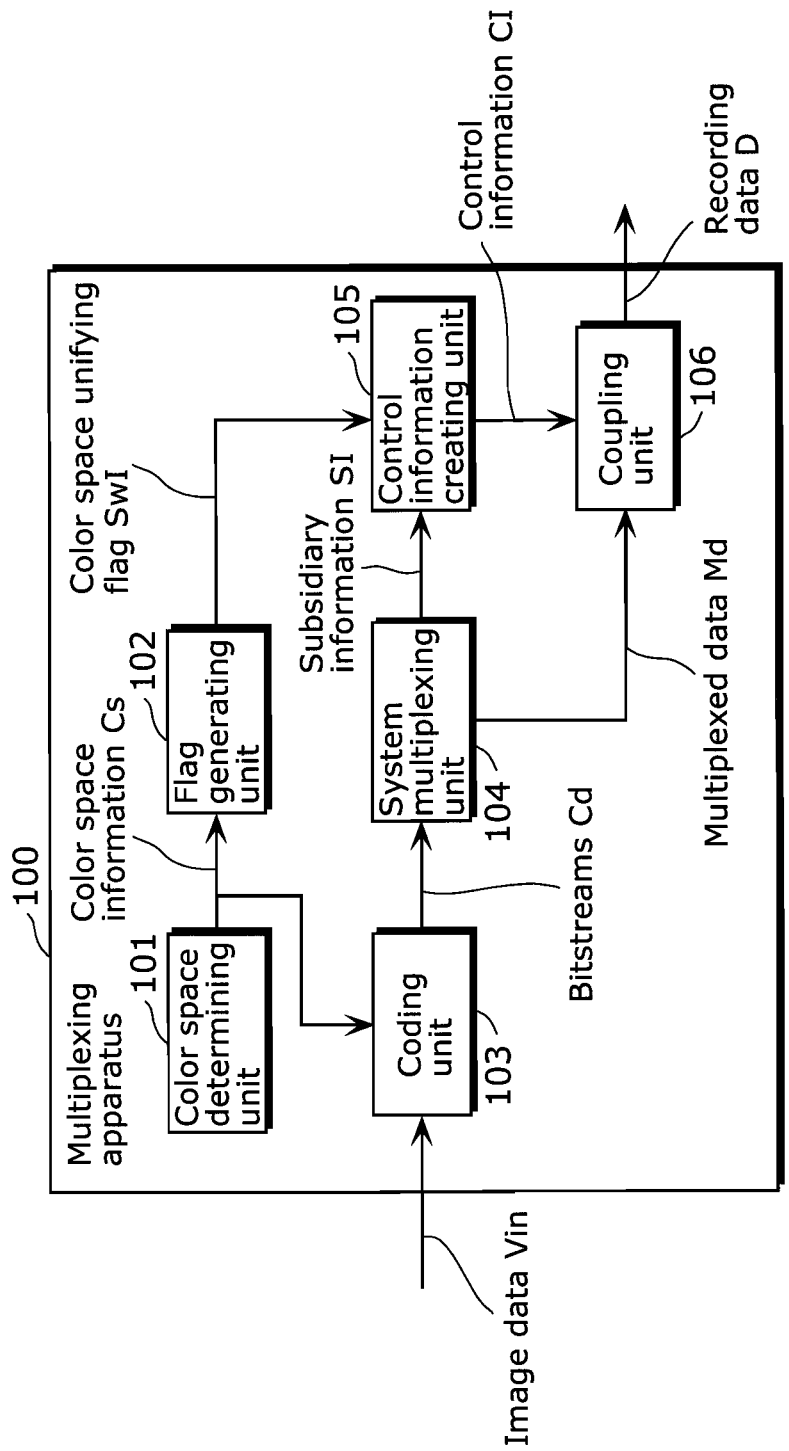
FIG. 1 is a block diagram showing the structure of a multiplexing apparatus for achieving the multiplexing method in the first embodiment of the present invention.

100 Multiplexing apparatus
101 Color space determining unit
102 Flag generating unit
103 Coding unit
104 System multiplexing unit
105 Control information creating unit
106 Coupling unit
200, 200a Reproducing apparatus
201 Decoding unit
202 First color conversion unit
203 Second color conversion unit
204 Control unit
205, 206 Switching unit
301 Decoding unit
310 Color conversion unit
311 Parameter holding unit

BEST MODE FOR CARRYING OUT THE INVENTION

First Embodiment

FIG. 1 is a block diagram showing the structure of a multiplexing apparatus for achieving a multiplexing method in a first embodiment of the present invention.

A multiplexing apparatus 100 in the present embodiment facilitates a reproduction process, and also reduces discomfort that is felt by a viewer about image quality when the reproduction process is performed. The multiplexing apparatus 100 includes: a color space determining unit 101, a flag generating unit 102, a coding unit 103, a system multiplexing unit 104, a control information creating unit 105, and a coupling unit 106.

The color space determining unit 101, for example, determines a color space for each of the clips as a moving-picture sequence shown by image data Vin, and outputs color space information Cs that indicates the determined color space in the flag generating unit 102 and the coding unit 103. Here, the color space determining unit 101 determines the color space that is common to the respective clips within a continuous reproduction unit. The continuous reproduction unit is made up of coded clips (bitstreams) that are recorded on a recording medium, and is structured to allow continuous reproduction of each of the bitstreams. For example, the continuous reproduction unit is bitstreams that are seamlessly connected, or bitstreams that are structured to allow multi-angle reproduction.

In other words, the color space determining unit 101 includes: a judging unit which judges whether or not the clip to be coded should be coded as part of the continuous reproduction unit, and a color space determining unit which determines, for the clip, a common color space within the continuous reproduction unit when judged that the clip should be coded as part of the continuous reproduction unit.

Note that the color space determining unit 101 determines a specific color space according to the operation by a user, or based on predetermined conditions and settings.

The coding unit 103 obtains the image data Vin, codes the data for each of the clips so as to fill the color space indicated by the color space information Cs, and outputs bitstreams Cd generated by the coding to the system multiplexing unit 104.

The flag generating unit 102, for example, generates a color space unifying flag SwI for each of the clips and outputs the color space unifying flag SwI to the control information creating unit 105. The color space unifying flag indicates whether or not the color spaces are uniform within the continuous reproduction unit. For example, when the color space unifying flag indicates 1, it is indicated that the color spaces are uniform for the respective clips within the continuous reproduction unit; whereas when the flag indicates 0, it is indicated that the color spaces are not uniform for respective clips that are not the continuous reproduction unit. In other words, when the color space unifying flag indicates 1, it is indicated that only one type of color space is defined within the continuous reproduction unit, that is, the color space is fixed within the continuous reproduction unit.

The system multiplexing unit 104 performs system multiplexing (packet multiplexing) on bitstreams Cd and also generates subsidiary information SI. In addition, the system multiplexing unit 104 outputs the generated subsidiary information SI to the control information creating unit 105, and also outputs multiplexed data Md, which is generated by system multiplexing, to the coupling unit 106. In the system multiplexing for BD-ROMs, a source packet is generated by adding a 4-bite header to an MPEG-2 transport stream which corresponds to a bitstream Cd. In addition, the subsidiary information SI is information for generating a time map to be included in the control information CI regarding the multiplexed data Md.

The control information creating unit 105 generates the time map and so on based on the subsidiary information SI, and generates the control information CI, which includes the time map and the color space unifying flag SwI. In addition, the control information CI indicates respective clips (bitstreams) which make up the continuous reproduction unit. Furthermore, the control information creating unit 105 outputs the control information CI to the coupling unit 106.

The coupling unit 106 creates recording data D by coupling the control information CI and the multiplexed data Md, and outputs the recording data D. The multiplexing apparatus 100 records the recording data D on a recording medium.

FIG. 2A is a diagram showing a continuous reproduction unit in the present embodiment.

The continuous reproduction unit in the present embodiment is made up of coded clips (bitstreams Cd), and the color spaces of respective clips are uniform, for example, according to the first color space. Note that each of the coded clips includes color space information Cs which indicates that the color space is the first color space.

In other words, FIG. 2A shows an example of restrictions on the unit of switching the color space definition in terms of bitstreams of an MPEG-2 or MPEG-4AVC moving picture. Note that in package media such as DVD-Videos and BD-ROMs, the unit of continuous reproduction of moving-picture bitstreams (continuous reproduction unit) is indicated by a playlist or the like.

Thus, in the present embodiment, since color spaces are uniform within the continuous reproduction unit, the switching of image processing methods for changing color spaces does not take place within a section that is continuously reproduced. As a result, it becomes possible to facilitate the reproduction process as well as reduce discomfort felt by a viewer about image quality.

FIG. 2B is a diagram showing another continuous reproduction unit in the present embodiment.

The color spaces of the respective clips within the continuous reproduction unit shown in FIG. 2B are uniform according to the second color space.

Note that there are two types of conditions for connecting the clips to be continuously reproduced: seamless connection and nonseamless connection. In nonseamless connection, the switching of color spaces may be permitted since there is a case where gaps occur in decoding operation when, for example, connected to an open Group Of Pictures (GOP). That is, in the present embodiment, among continuous reproduction units, color spaces are uniform only within a continuous reproduction unit in which respective clips are seamlessly connected. In addition, in order to eliminate subjective discomfort that is felt about nonseamlessly connected clips, the color spaces may be uniform within the continuous reproduction unit which includes nonseamlessly connected clips, and also color spaces may be uniform for all the moving pictures to be recorded on the recording medium.

FIG. 2C is a diagram showing yet another continuous reproduction unit in the present embodiment.

In the case where a multi-angle function is supported, as with DVD-Videos or BD-ROMs, color spaces may be uniform for moving pictures to be connected by switching angles. For example, as shown in FIG. 2C, the continuous reproduction unit is made up of moving pictures, which have been imaged and coded from three different angles (angle 1, angle 2, and angle 3) so as to allow multi-angle reproduction. In addition, each of the angle 1, angle 2, and angle 3 is made up of, for example, clips that are seamlessly connected and assigned with a time stamp along the common time axis. When the multi-angle reproduction is performed, a user can arbitrarily select one from among the three angles in the middle of each clip. For example, the user can switch angles in the middle of the reproduction of the angle-1 clip and continue the reproduction from the middle of the angle-2 or angle-3 clip.

In the present embodiment, even in the case where such multi-angle reproduction is performed, since the color spaces of all the angle-1, angle-2, and angle-3 moving pictures making up the continuous reproduction unit are uniform, for example, according to the first color space, it is possible to eliminate discomfort about subjective image quality, which is caused by color space differences when angles are switched.

Figure 3:
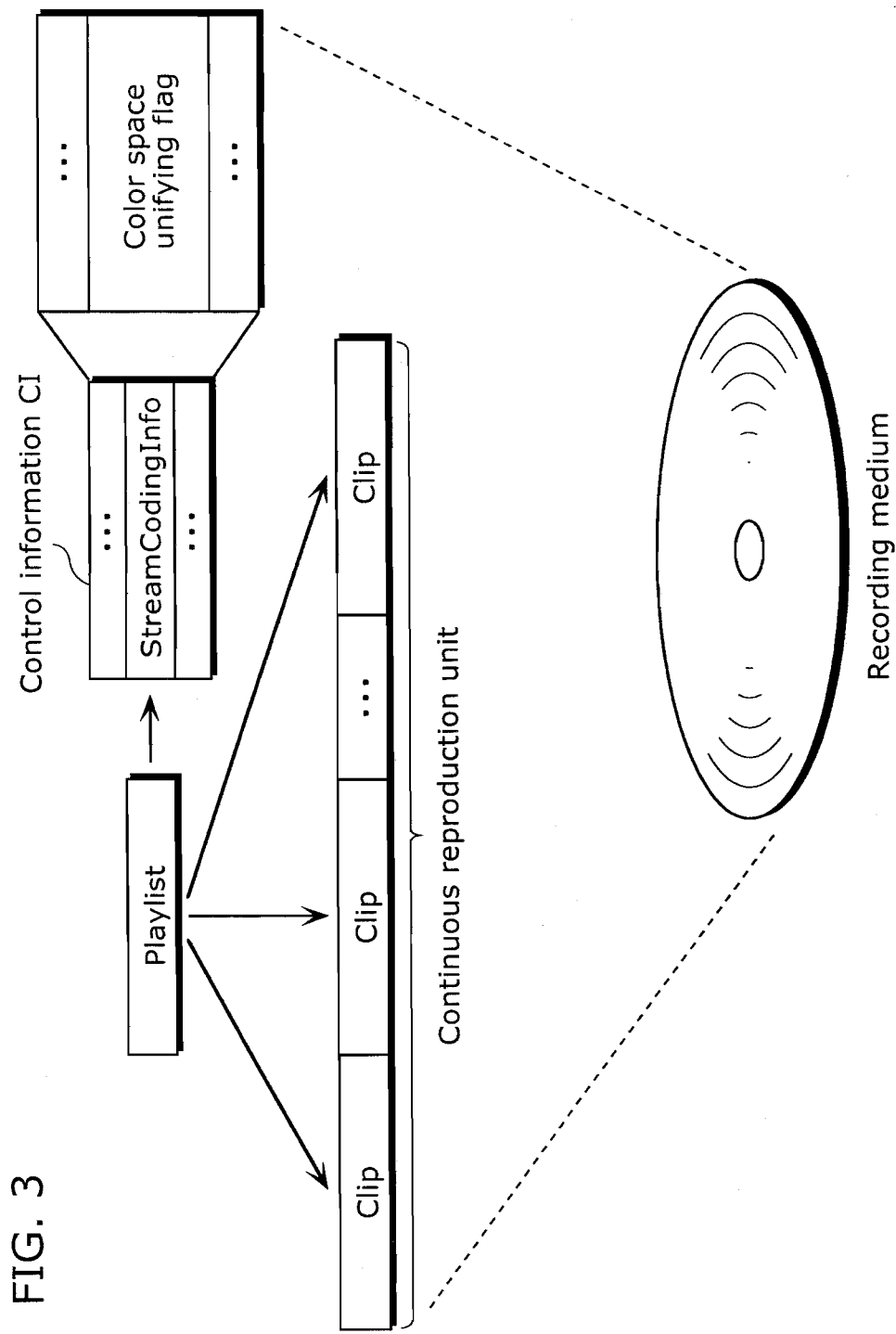
FIG. 3 is a diagram showing an example of information recorded on a recording medium by the multiplexing apparatus in the first embodiment of the present invention.

FIG. 3 is a diagram showing an example of information recorded on a recording medium by the multiplexing apparatus 100 in the present embodiment.

On the recording medium, coded clips (bitstreams) are recorded as a continuous reproduction unit as shown in FIGS. 2A to 2C, and the color spaces of the respective clips are uniform within the continuous reproduction unit. Note that on the recording medium, discontinuous bitstreams, which are bitstreams not included in the continuous reproduction unit, are also recorded.

In addition, a playlist is provided for each of the recording media as package media such as DVD-Videos and BD-ROMs, and the color space unifying flag is recorded as part of control information CI that is included in the playlist. In addition, the color space unifying flag is stored, for example, in an area referred to as Stream Coding Info within the control information CI. The color space unifying flag like this indicates that the unit of switching for color space definition is restricted in MPEG-2 and MPEG-4AVC streams.

Note that the description of the coding method may be treated as the above-described color space unifying flag. That is, in BD-ROMs, the coding method for each of the clips that is referred to from the playlist is stored in the area referred to as Stream Coding Info within the control information. Therefore, when the coding method within the area is indicated to be MPEG-2 or MPEG-4AVC, it is indicated that, in the coding method, the color space is fixed within the continuous reproduction unit as is the case with the color space unifying flag indicating 1.

In addition, an identification number or the like, which specifically indicates what color space to use, may be separately recorded on the recording medium, and further, the information indicating the unit of switching for color space definition may also be stored. In addition, a flag, which indicates whether the color space definition for the moving pictures recorded on the recording medium is only of one type or more than one type, may be stored as the above-described color space unifying flag. In addition, in the case where the recording of moving pictures of two color spaces, that is, conventional color gamut (narrow color-gamut space) and wide color gamut (wide color-gamut space), is permitted, a flag, which indicates whether only moving pictures of conventional color gamut is recorded or whether there is any possibility that a moving picture of wide color gamut is recorded, may be stored in the above-described color space unifying flag. By using the flag like this, the reproducing apparatus can easily judge, when reproducing the recording medium, whether or not the color space definition on the recording medium is only of one type, or whether or not the color space on the recording medium is only a conventional color gamut, and thus the color conversion process can be simplified.

Figure 4:
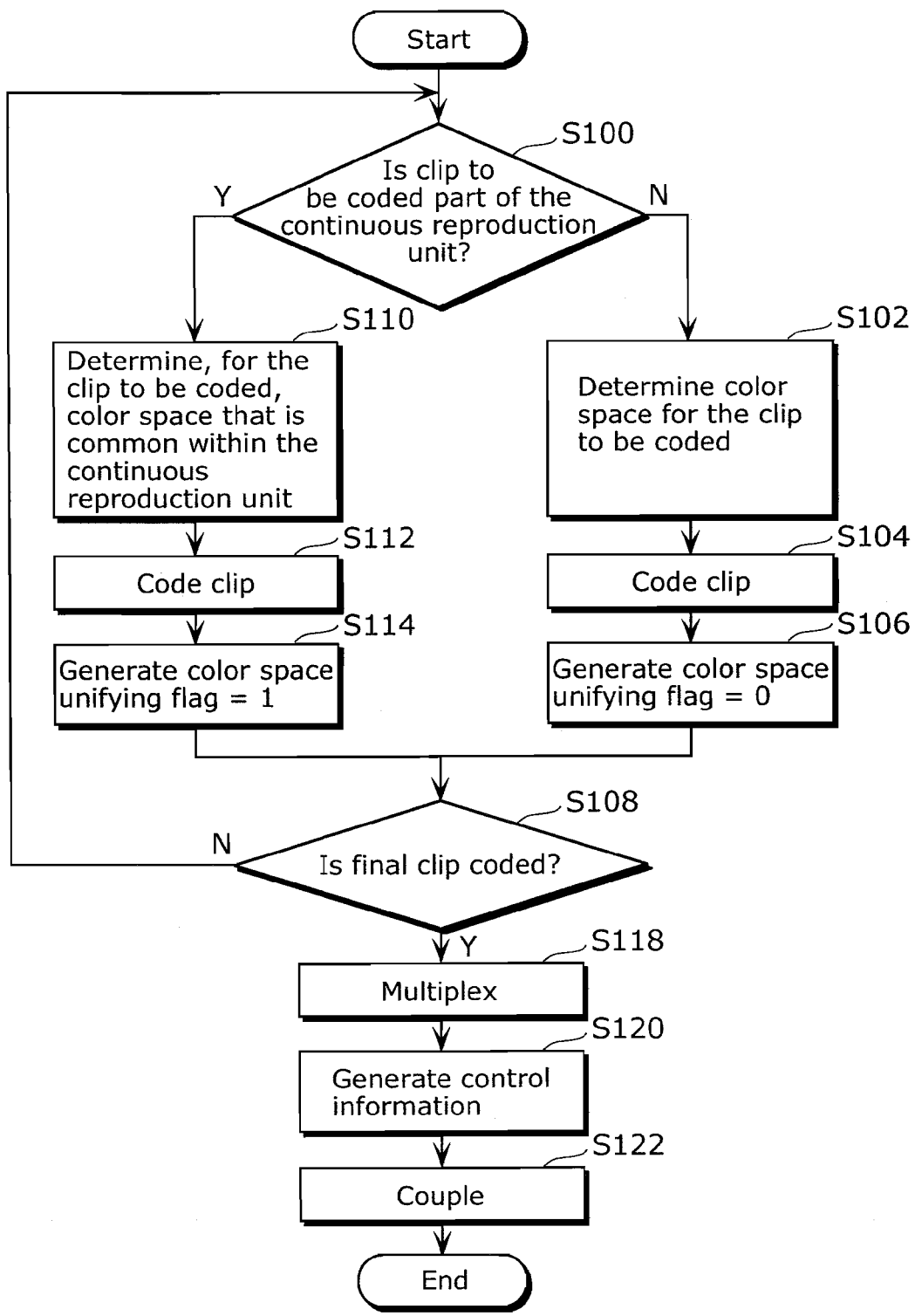
FIG. 4 is a flowchart showing the operation of the multiplexing apparatus 100 in the present embodiment.

FIG. 4 is a flowchart showing the operation of the multiplexing apparatus 100 in the present embodiment.

First, the color space determining unit 101 in the multiplexing apparatus 100 judges whether or not the clip to be coded should be part of the continuous reproduction unit (Step S100). For example, the color space determining unit 101 judges whether or not to perform coding on the clip to be coded so as to allow seamless connection with the immediately preceding clip. Subsequently, upon judging that the coding for allowing seamless connection should not be performed, the color space determining unit 101 further judges whether or not to perform coding on the clip to be coded so as to allow multi-angle reproduction with the immediately preceding clip. As a result, when judged that coding should be performed so as to allow seamless connection and that the coding should be performed so as to allow multi-angle reproduction, the color space determining unit 101 judges that the clip to be coded should be part of the continuous reproduction unit; whereas, in a case other than this, the color space determining unit 101 judges that the clip to be coded should not be part of the continuous reproduction unit.

Here, upon judging the clip to be coded should not be part of the continuous reproduction unit (N in Step S100), the color space determining unit 101 determines the color space for the clip to be coded (Step S102). As a result, the coding unit 103 codes the clip so as to be in accordance with the color space determined in the color space determining unit 101 (Step S104). At this time, the coding unit 103 stores, in the coded clip, color space information Cs indicating the determined color space. Furthermore, the flag generating unit 102 generates a color space unifying flag which indicates 0 with respect to the clip (Step S106).

Subsequently, the coding unit 103 judges whether or not the final clip has been coded (Step S108), and when judging that coding is not yet performed (N in Step S108), the multiplexing apparatus 100 repeatedly performs the operation from Step S100 on the succeeding clip to be coded.

On the other hand, when it is judged that the clip to be coded should be part of the continuous reproduction unit in Step S100 (Y in Step S100), the color space determining unit 101 determines, for the clip, a color space that is common within the continuous reproduction unit (Step S110). That is, the color space determining unit 101 determines the color space based on the operation by the user or predetermined conditions and settings in the case where the clip to be coded is the initial clip within the continuous reproduction unit. In addition, for clips among which the clip to be coded is not in the initial position within the continuous reproduction unit, the color space determining unit 101 determines, for the clip to be coded, the same color space as the color space determined with respect to the immediately preceding clip.

As a result, the coding unit 103 codes the clip so as to be in accordance with the color space determined in the color space determining unit 101 (Step S112). For example, when the color space of the clip to be coded, which is shown by the image data Vin, is different from the color space determined in Step S110, the coding unit 103 converts the color space of the clip into the determined color space, and codes the clip to be coded that is expressed according to the converted color space. With this, the color spaces within the continuous reproduction unit are uniform. In addition, at this time, the coding unit 103 stores, into the coded clip, color space information Cs indicating the determined color space. Subsequently, the flag generating unit 102 generates a color space unifying flag which indicates 1 with respect to the clip (Step S114).

Subsequently, the coding unit 103 judges whether or not the final clip has been coded (Step S108), and when judging that the coding is not yet performed (N in Step S108), the multiplexing apparatus 100 repeatedly performs the operation from Step S100 on the succeeding clip to be coded.

When judged that the final clip has been coded in Step S108 (Y in Step S108), the system multiplexing unit 104 generates multiplexed data Md by performing system multiplexing and also generates subsidiary information SI (Step S118). Subsequently, the control information creating unit 105 generates control information CI using the color space unifying flag generated in steps S106 and S114, and the subsidiary information SI generated in Step S118 (Step S120).

The coupling unit 106 generates recoding data D by coupling the multiplexed data Md generated in Step S118 and the control information CI generated in Step S120 (Step S122).

Note that although, in the above example, the flag generating unit 102 generates a color space unifying flag for each of the clips, one color space unifying flag may also be generated for the continuous production unit.

Thus, the multiplexing apparatus 100 in the present embodiment restricts the unit of switching for color space definition by restricting the color space definition to only one type within the continuous reproduction unit, and also records, on a recording medium, the color space unifying flag which indicates that the unit of switching is restricted. In addition, on the recording medium in the present embodiment, the color spaces of the respective clips in the continuous reproduction unit are uniform, and the above-described color space unifying flag is recorded. With this, the reproducing apparatus, which reproduces moving pictures recorded on the recording medium, can reproduce the moving pictures without switching color conversion methods within the continuous reproduction unit, thereby facilitating the reproduction process. Furthermore, since changing of color spaces does not take place within the continuous reproduction unit, the discomfort that is felt by a viewer about image quality can be reduced.

Note that when creating data with an authoring tool or the like, there is a case where the generation of bitstreams Cd and the creation of control information CI are performed by separate apparatuses. In such a case, each of the apparatuses performs the same operation as each of the structural elements in the multiplexing apparatus 100. That is, the multiplexing apparatus 100 in the present embodiment includes: an apparatus for generating bitstreams Cd, an apparatus for performing system multiplexing, and an apparatus for creating control information CI.

In addition, the present invention may also be realized as a recording apparatus although, in the present embodiment, the present invention is described as a multiplexing apparatus.

Second Embodiment

The reproducing apparatus in the present embodiment can read out and reproduce recording data D, which is recorded on a recording medium by the multiplexing apparatus 100 in the first embodiment.

Figure 5:
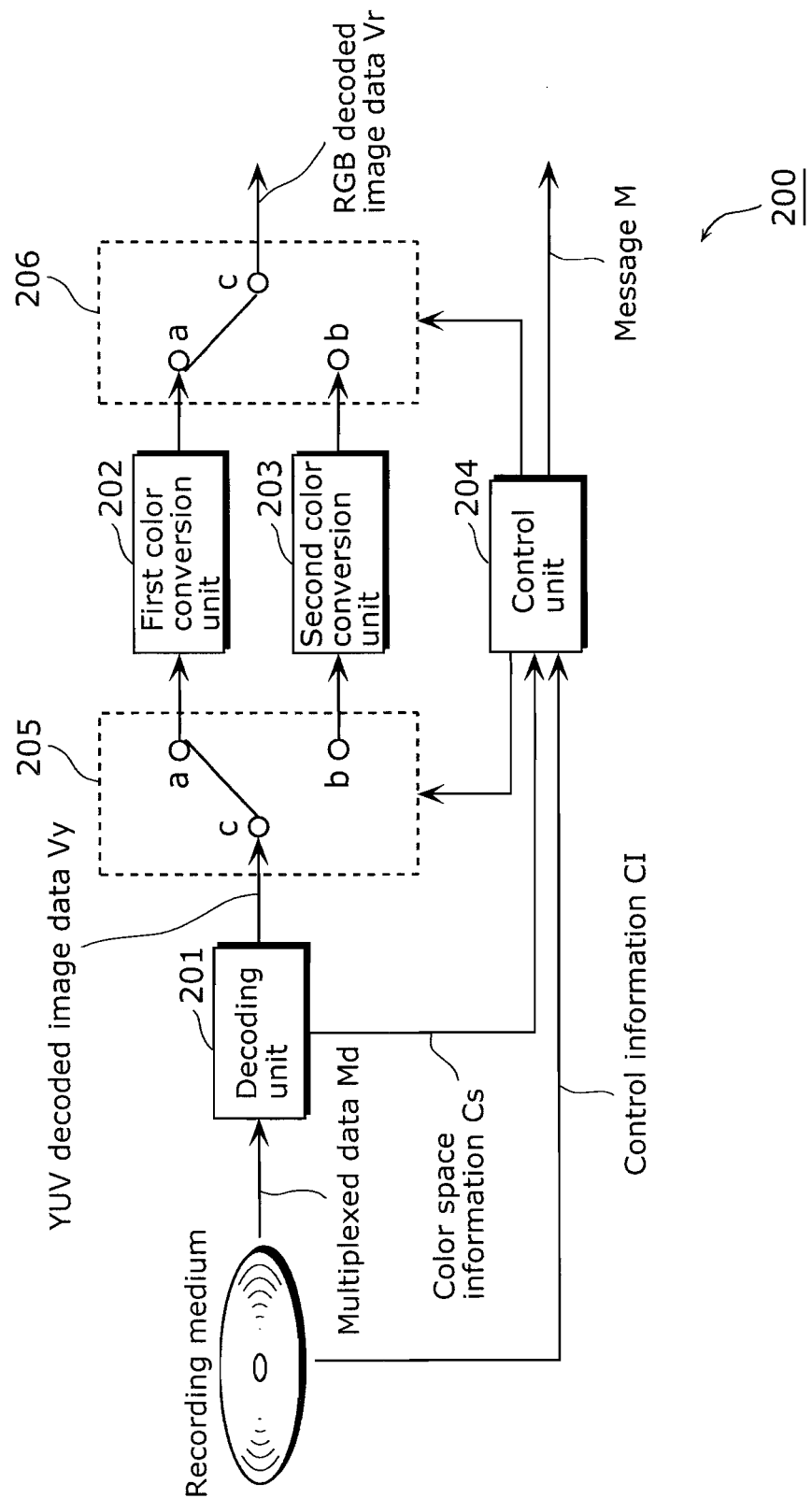
FIG. 5 is a block diagram showing the structure of the reproducing apparatus in the present embodiment.

FIG. 5 is a block diagram showing the structure of the reproducing apparatus which realizes the reproduction method in the present embodiment.

A reproducing apparatus 200 in the present embodiment includes: a decoding unit 201, a first color conversion unit 202, a second color conversion unit 203, a control unit 204, and switching units 205 and 206.

The decoding unit 201 obtains multiplexed data Md from the recording data D read out from the recording medium, and decodes the multiplexed data Md according to the coding method of the data (for example, the MPEG-2 or MPEG-4AVC format). As a result, the decoding unit 201 generates and outputs YUV decoded image data Vy that is expressed in the YUV format. In addition, the decoding unit 201 extracts, and outputs, to the control unit 204, color space information Cs included in each of the bitstreams (clips) in the multiplexed data Md.

The first color conversion unit 202 converts the YUV decoded image data Vy expressed according to a first color space, into RGB decoded image data Vr expressed in the RGB format according to the first color space, using a color conversion parameter corresponding to the first color space.

The second color conversion unit 203 converts the YUV decoded image data Vy expressed according to a second color space, into RGB decoded image data Vr expressed according to the RGB format, using a color conversion parameter corresponding to the second color space.

Note that the color conversion parameter corresponding to the first color space and the color conversion parameter corresponding to the second color space are different from each other. In addition, the color conversion parameter includes, for example: a color conversion matrix that is used for converting the YUV format into the RGB format, R/G/B/White chromaticity points, transfer characteristics, and domains of definition (color gamut) in the YUV space and the RGB space.

For example, in the case where a wide-color-gamut YUV signal (YUV decoded image data Vy), such as the xvYCC standard, is treated, the first color conversion unit 202 and the second color conversion 203 output RGB decoded image data Vr of an RGB signal, which has values expanded, logically, from negative to 1.0 or more. Therefore, the units which treat the RGB decoded image data outputted from the first color conversion unit 202 and the second color conversion unit 203 (for example, the switching unit 206, and an editing apparatus, a display apparatus (not shown), and so on that are located in the subsequent stage) should be able to treat the values from negative to 1.0 or more.

In addition, when treating a narrow-color-gamut YUV signal (YUV decoded image data Vy), such as BT. 601 and BT. 709 standards, the first color conversion unit 202 and the second color conversion unit 203 output RGB decoded image data Vr of an RGB signal, which has, logically, values from 0.0 to 1.0.

In the switching unit 205, a terminal c is connected by switching between a terminal a or a terminal b according to the control from the control unit 204. In other words, the switching unit 205 outputs the YUV decoded image data Vy generated in the decoding unit 201, to the first color conversion unit 202, by connecting the terminal c to the terminal a, and outputs the YUV decoded image data Vy generated in the decoding unit 201, to the second color conversion unit 203, by connecting the terminal c to the terminal b.

In the switching unit 206, a terminal c is connected by switching between a terminal a and a terminal b according to the control from the control unit 204. In other words, the switching unit 206 outputs the RGB decoded image data Vr generated in the first color conversion unit 202, to the outside of the reproducing apparatus 200 by connecting the terminal c to the terminal a, and outputs the RGB decoded image data Vr generated in the second color conversion unit 203, to the outside of the reproducing apparatus 200 by connecting the terminal c to the terminal b.

The control unit 204 obtains the color space information Cs from the decoding unit 201, and also obtains control information CI from the recording medium. In the control information CI, a color space unifying flag is stored corresponding to each of the decoded clips. When the color space unifying flag corresponding to the decoded clip indicates 0, the control unit 204 controls the switching units 205 and 206 according to the color space information CS corresponding to the clip. That is, when the color space information Cs indicates the first color space, the control unit 204 connects the respective terminals c to the terminals a in the switching units 205 and 206 by controlling the switching unit 205 and 206. As a result, the first color conversion unit 202 obtains the YUV decoded image data Vy expressed according to the first color space from the decoding unit 201, converts the YUV decoded image data Vy into RGB decoded image data Vr, and outputs the RGB decoded image data Vr. On the other hand, when the color space information Cs indicates the second color space, the control unit 204 connects the respective terminals c to the terminals b in the switching units 205 and 206 by controlling the switching units 205 and 206. As a result, the second color conversion unit 203 obtains YUV decoded image data Vy expressed according to the second color space from the decoding unit 201, converts the YUV decoded image data Vy into RGB decoded image data Vr, and outputs the RGB decoded image data Vr.

In addition, there is a possibility that the color space of the clip which corresponds to the color space unifying flag indicating 0 is different from the color space of the immediately preceding or immediately succeeding clip. Therefore, when the color space unifying flag indicating 0 is obtained, the control unit 204, for example, generates and outputs a message M, which notifies to a user the possibility that discomfort may be caused when moving picture sequences are switched. The display, having obtained the message M like this, displays and notifies to the user the details as described above.

Here, when the color space unifying flag corresponding to the clips decoded as part of the continuous reproduction unit indicates 1, the control unit 204 recognizes that the color spaces of all the clips within the continuous reproduction unit are uniform.

In other words, when the color space unifying flag corresponding to the clip that is initially decoded as part of the continuous reproduction unit indicates 1, the control unit 204 controls the switching units 205 and 206 according to the color space information Cs corresponding to the clip, just as the case described earlier where the color space unifying flag indicates 0. However, the control unit 204 stops switching control over the switching units 205 and 206, with respect to a clip that is decoded as part of the continuous reproduction unit after the initial clip described above, without identifying the color space information Cs corresponding to the clip. That is, the control unit 204 applies the color conversion unit having been applied to the initial clip within the continuous reproduction unit (the first color conversion unit 202 or the second color conversion unit 203), to the succeeding clips within the continuous reproduction unit. As a result, within the continuous reproduction unit, the switching between the first color conversion unit 202 and the second color conversion unit 203 is not performed, and only one of the color conversion units is used.

Note that in the reproducing apparatus 200, the first color conversion unit and the second color conversion unit include: the first color conversion unit 202, the second color conversion unit 203, the switching units 205 and 206, and the control unit 204. Here, in the case where the YUV decoded image data Vy is decoded from the bitstreams of the continuous reproduction unit, the first color conversion unit converts the color format of the YUV decoded image data Vy by applying, to the YUV decoded image data Vy, a color conversion parameter that is common within the continuous reproduction unit. In the case where the YUV decoded image data Vy is decoded from discontinuous bitstreams, the second color conversion unit converts the color format of the YUV decoded image data Vy by identifying the color conversion parameter appropriate for the discontinuous bitstreams and applying the color conversion parameter to the YUV decoded image data Vy.

In addition, in the above example, the control unit 204 obtains from the decoding unit 201, the color space information Cs extracted from the multiplexed data Md. However, in the case where the color space information Cs is included in the control information CI, the color space information Cs may be obtained from the control information CI.

Here, for example, there is a case where the Flag, which indicates whether the color space definition for the moving pictures recorded on the recording medium is only of one type or more than one type, is stored in the control information on the recording medium. In addition, there is also a case where it is permitted to record, on a recording medium, moving pictures of two color spaces, that is, conventional color gamut and wide color gamut, and where a flag, which indicates whether only moving pictures of conventional color gamut is recorded, or whether there is any possibility that a moving picture of wide color gamut is recorded, is stored in the control information of the recording medium. In this case, by reading out the flag and judging on the flag value, the control unit 204 can easily judge whether or not the color space definition on the recording medium is only of one type, or whether or not the color space on the recording medium is the conventional color gamut, and the color conversion process can be further simplified.

Meanwhile, the reproducing apparatus in the present embodiment includes the first color conversion unit 202 and the second color conversion unit 203. However, instead of these two color conversion units, a color conversion unit to be used by switching different color conversion parameters may be included.

Figure 6:
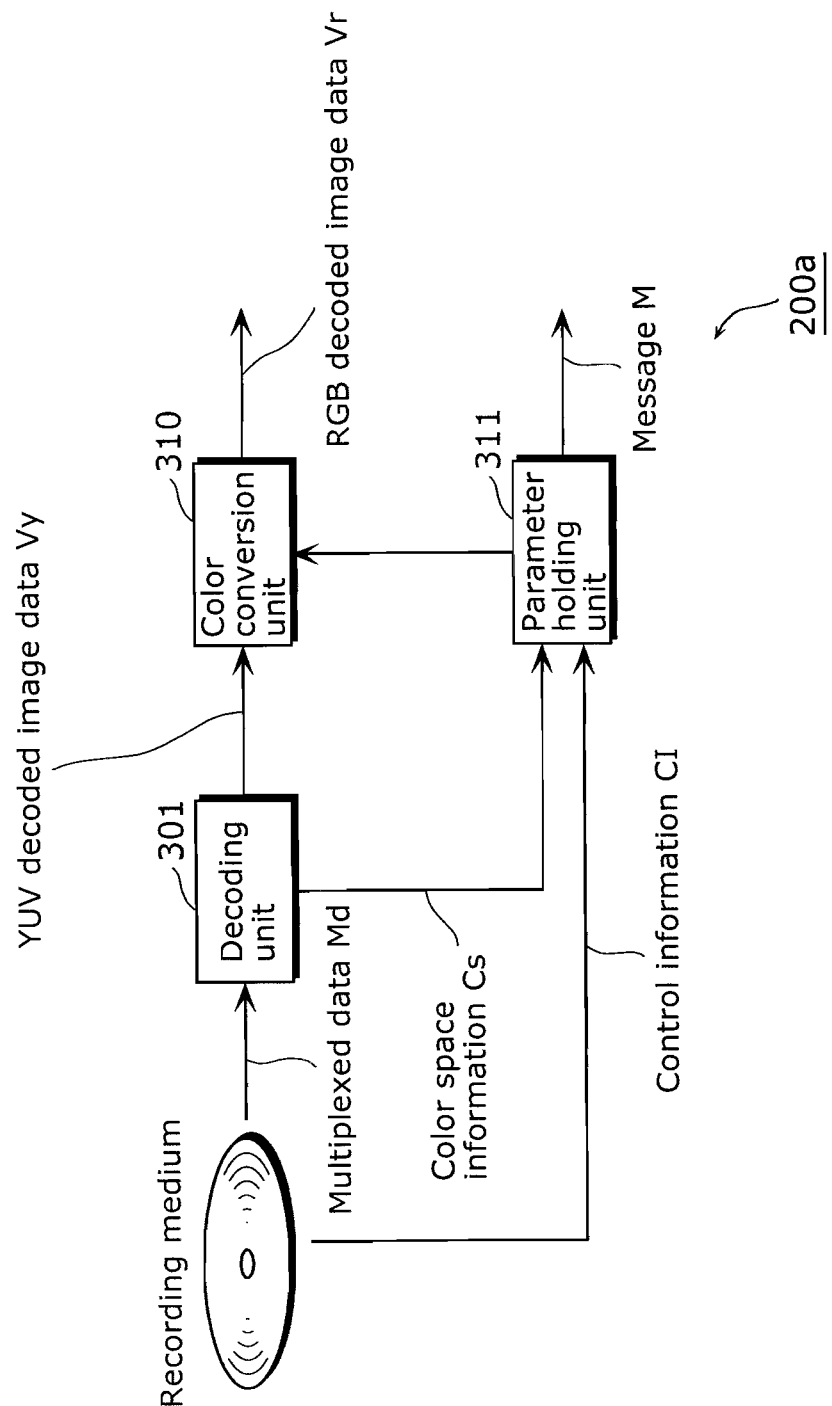
FIG. 6 is a block diagram showing the structure of the reproducing apparatus in the present embodiment, which includes only one color conversion unit.

FIG. 6 is a block diagram showing the structure of a reproducing apparatus in the present embodiment, which includes only one color conversion unit.

The reproducing apparatus 200a includes: a decoding unit 301, a color conversion unit 310, and a parameter holding unit 311. The decoding unit 301 has an identical function as the decoding unit 201 described earlier.

The color conversion unit 310 obtains YUV decoded image data Vy from the decoding unit 201, and also obtains from the parameter holding unit 311, a color conversion parameter corresponding to the above-described first color space (hereinafter, referred to as the first color conversion parameter), and a color conversion parameter corresponding to the above-described second color space (hereinafter, referred to as the second color conversion parameter). Furthermore, the color conversion unit 310, upon obtaining the first color conversion parameter, converts the YUV decoded data Vy expressed according to the first color space, using the first color conversion parameter, into the RGB decoded image data Vr that is expressed in the RGB format according to the first color space. In addition, upon obtaining the second color conversion parameter, the color conversion unit 310 converts, using the second color conversion parameter, the YUV decoded data Vy expressed according to the second color space into RGB decoded image data Vr expressed in the RGB format according to the second color space.

For example, when treating a wide-color-gamut YUV signal (YUV decoded image data Vy), such as the xvYCC standard, the color conversion unit 310 outputs RGB decoded image data Vr of an RGB signal, which has values expanded, logically, from negative to 1.0 or more. Therefore, the units which treat the RGB decoded image data Vr outputted from the color conversion unit 310 (for example, an editing apparatus and a display apparatus (not shown), and so on) should be able to treat the values from negative to 1.0 or more.

In addition, when treating a narrow-color-gamut YUV signal (YUV decoded image data Vy), such as the BT. 601 and the BT. 709 standards, the color conversion unit 310 outputs RGB decoded image data Vr of an RGB signal having, logically, values from 0.0 to 1.0.

The parameter holding unit 311 holds the first color conversion parameter and the second color conversion parameter. The parameter holding unit 311 obtains color space information Cs from the decoding unit 301, and also obtains control information CI from the recording medium. When the color space unifying flag corresponding to the decoded clip indicates 0, the parameter holding unit 311 selects and outputs to the color conversion unit 310, one of the first color conversion parameter and the second color conversion parameter according to the color space information Cs corresponding to the clip. That is, when the color space information Cs indicates the first color space, the parameter holding unit 311 selects and outputs the first color conversion parameter to the color conversion unit 310. As a result, the color conversion unit 310 obtains from the decoding unit 301, YUV decoded image data Vy expressed according to the first color space, converts the YUV decoded image data Vy into RGB decoded image data Vr, and outputs the RGB decoded image data Vr. On the other hand, when the color space information Cs indicates the second color space, the parameter holding unit 311 selects and outputs the second color conversion parameter to the color conversion unit 310. As a result, the color conversion unit 310 obtains, from the decoding unit 301, YUV decoded image data Vy expressed according to the second color space, converts the YUV decoded image data Vy into RGB decoded image data Vr, and outputs the RGB decoded image data Vr.

In addition, there is a possibility that the color space of the clip which corresponds to the color space unifying flag indicating 0 may be different from the color space of the immediately preceding or immediately succeeding clip. Therefore, upon obtaining the color space unifying flag indicating 0, the parameter holding unit 311, for example, generates and outputs a message M that notifies to a user the possibility that discomfort may be caused when moving picture sequences are switched. The display, having obtained the message M like this, displays and notifies to the user the details as described above.

Here, when the color space unifying flag corresponding to the clip that is decoded as part of the continuous reproduction unit indicates 1, the parameter holding unit 311 recognizes that the color spaces of all the clips within the continuous reproduction unit are uniform.

That is, when the color space unifying flag corresponding to the clip initially decoded as part of the continuous reproduction unit indicates 1, the parameter holding unit 311 selects and outputs the color conversion parameter (the first color conversion parameter or the second color conversion parameter) according to the color space information Cs corresponding to the clip, just as the case where the color space unifying flag indicates 0. However, the parameter holding unit 311, stops selecting and outputting the color conversion parameter for a clip that is decoded as part of the continuous reproduction unit after the initial clip, without identifying the color space information Cs corresponding to the clip. In other words, the parameter holding unit 311 applies the color conversion parameter having been applied to the initial clip within the continuous reproduction unit, to the succeeding clips within the continuous production unit. As a result, within the continuous reproduction unit, the switching between the first color conversion parameter and the second color conversion parameter is not performed, and only one of the color conversion parameters is used.

Note that in the reproducing apparatus 200a, the first color conversion unit and the second color conversion unit include the color conversion unit 310 and the parameter holding unit 311.

Figure 7:
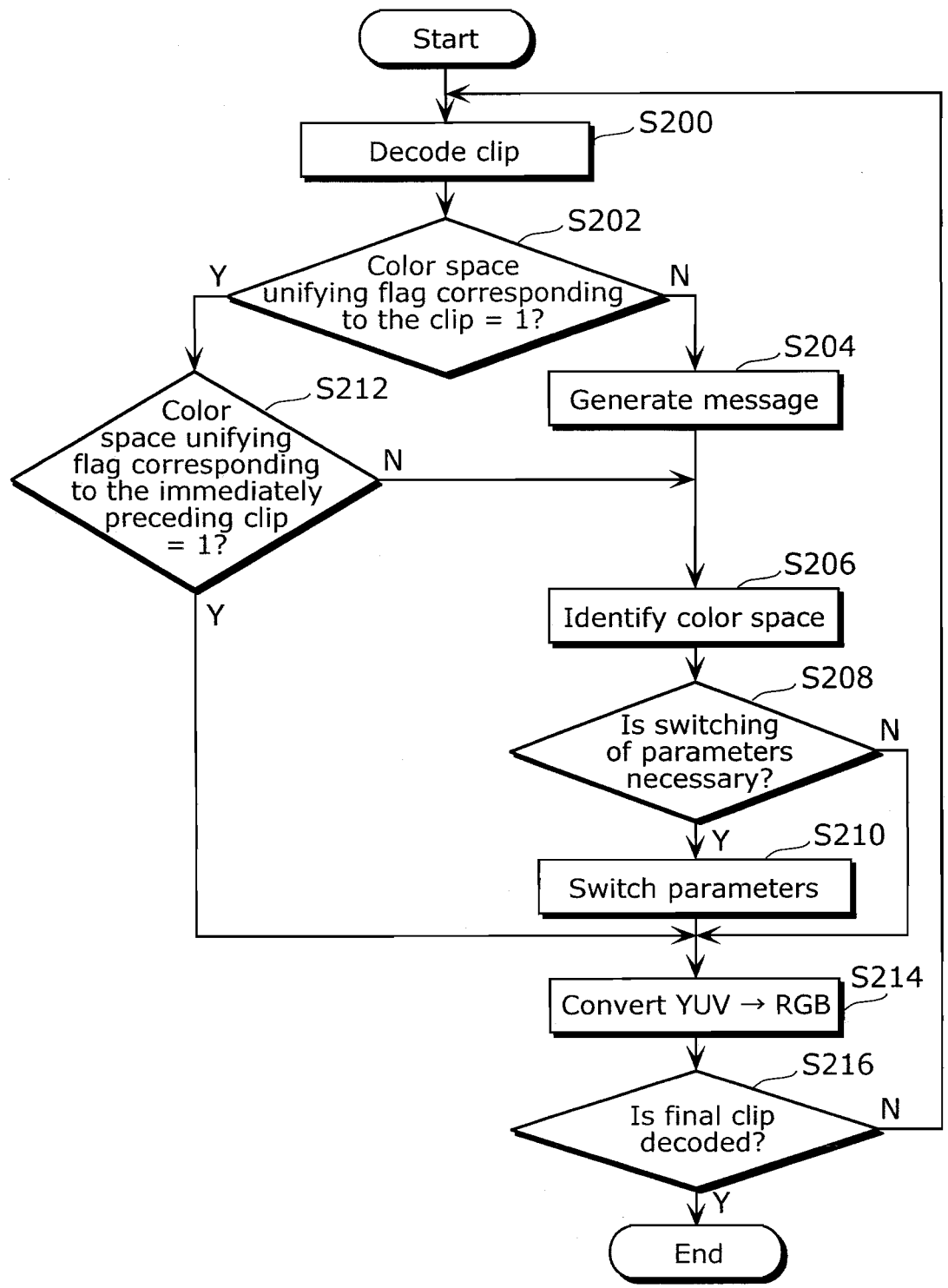
FIG. 7 is a flowchart showing the operation of the reproducing apparatus in the present embodiment.

FIG. 7 is a flowchart showing the operation of the reproducing apparatus 200a in the present embodiment.

First, the decoding unit 301 in the reproducing apparatus 200a obtains multiplexed data Md that is read out from the recording medium, and decodes the coded clip shown by the multiplexed data Md (Step S200). The parameter holding unit 311 judges whether or not the color space unifying flag corresponding to the decoded clip indicates 1 (Step S202).

Upon judging that the color space unifying flag indicates 0 (N in Step S202), the parameter holding unit 311 generates the above-described message M (Step S204) since there is a possibility that the above-described coded clip is a discontinuous bitstream and that the color space of the clip is different from the color space of the preceding or succeeding clip. Subsequently, the parameter holding unit 311 identifies what color space is indicated by the color space information Cs corresponding to the clip, which has been extracted in the decoding unit 301 (Step S206).

The parameter holding unit 311 judges whether or not it is necessary to switch the color conversion parameter to be used in the color conversion unit 310 (Step S208). Here, upon judging that the switching is necessary, the parameter holding unit 311 switches color conversion parameters (Step S210) by selecting and outputting to the color conversion unit 310, the color conversion parameter that is to be used in the color conversion unit 310 (the first color conversion parameter or the second color conversion parameter).

On the other hand, upon judging that the color space unifying flag indicates 0 (Y in Step S202), the parameter holding unit 311 further judges whether or not the color space unifying flag corresponding to the clip decoded immediately before the clip decoded in Step S200 indicates 1 (Step S212). That is, the parameter holding unit 311 judges whether or not the clip decoded in Step S200 is the initial clip within the continuous reproduction unit. Here, the parameter holding unit 311 performs the operation from Step S206, when judging that the color space unifying flag corresponding the immediate preceding clip indicates 0 (N in Step S212), that is, the clip decoded in Step S200 is the initial clip of the continuous reproduction unit. On the other hand, the parameter holding unit 311 stops the process of switching color conversion parameters without performing the operation from S206, when judging that the color space unifying flag corresponding to the immediately preceding clip indicates 1 (Y in Step S212), that is, the clip decoded in the Step S200 is not in the initial position within the continuous reproduction unit.

When, in Step 210, obtaining the color conversion parameter from the parameter holding unit 311, the color conversion unit 310 converts YUV decoded image data Vy into RGB decoded image data Vr using the color conversion parameter (Step S214). In addition, when the switching of the color conversion parameter is judged as not necessary (N in Step S208), or when the clip decoded in Step S200 is judged as not being in the initial position within the continuous reproduction unit (Y in Step S212), the color conversion unit 310 converts YUV decoded image data Vy into RGB decoded image data Vr (Step S214), using the color conversion parameter already being used. The RGB decoded image data Vr that has thus been converted is outputted to the display, and pictures represented by the RGB decoded image data Vr are displayed. Thus, the recording data D recorded on the recording medium is reproduced.

The decoding unit 301 judges whether or not the final clip has been decoded (Step S216). When judging that the final clip has been decoded (Y in Step S216), the decoding unit 301 stops the decoding process; when judging that the final clip is not yet performed (N in Step S216), the decoding unit 301 performs the decoding process from Step S200 on the clip to be decoded next.

As thus far described, in the present embodiment, YUV decoded image data Vy is generated by decoding bitstreams Cd. Furthermore, when the color space unifying flag corresponding to the bitstreams Cd indicates 1, that is, when the YUV decoded image data Vy has been decoded from the bitstreams of the continuous reproduction unit, a color conversion parameter that is common within the continuous reproduction unit is applied to the YUV decoded image data Vy. As a result, the color format of the YUV decoded image data Vy is converted into the RGB format. In addition, when the color space unifying flag corresponding to the bitstreams indicates 0, that is, when the YUV decoded image data Vy is decoded from discontinuous bitstreams, the color conversion parameter appropriate for the discontinuous bitstreams is specified according to the color space information Cs included in the discontinuous bitstreams. Subsequently, by applying the color conversion parameter to the YUV decoded image data Vy, the color format of the YUV decoded image data Vy is converted into the RGB format.

Therefore, the reproducing apparatuses 200 and 200a in the present embodiment can reproduce a moving picture without switching color conversion methods within the continuous reproduction unit since they reproduce the continuous production unit in which color spaces are uniform. This facilitates the reproduction process as well as reduces discomfort that is felt about image quality. Furthermore, the use of the color space unifying flag can save the effort of identifying the color space indicated by the color space information Cs, which is stored in each of the clips within the continuous reproduction unit.

Note that although, in the above example, the parameter holding unit 311 obtains from the decoding unit 301 color space information Cs extracted from multiplexed data Md, the color space information Cs may also be obtained from the control information CI in the case where the color space information Cs is included in control information CI.

Here, for example, there is a case where a flag, which indicates whether the color space definition for the moving pictures recorded on the recording medium is only of one type or more than one type, is stored in the control information on the recording medium. In addition, there is a case where the recording of moving pictures of two color spaces, that is, conventional color gamut (narrow color-gamut space) and wide color gamut (wide color-gamut space), is permitted, and where a flag, which indicates whether only a moving picture of conventional color gamut is recorded or whether there is any possibility that a moving picture of wide color gamut is recorded, is stored in the control information on the recording medium. In this case, by reading out the flag and judging on the flag value, the parameter holding unit 311 can easily judge whether or not the color space definition on the recording medium is only of one type, or whether or not the color space on the recording medium is conventional color gamut, and thus the color conversion process can be further simplified.

Thus far, the present invention has been described using the first and the second embodiments. However, the present invention is not limited to these, and various changes and modifications can be made without departing from the scope of the present invention.

For example, although the first and the second embodiments have been described using two types of color spaces (the first color space or the second color space), the multiplexing apparatus in the first embodiment and the reproducing apparatus in the second embodiment may have a structure that allows handling of three or more types of color spaces.

In addition, although, in the first and the second embodiments, MPEG-2 and MPEG-4AVC are given as exemplary coding methods for moving pictures, other coding methods may also be used.

In addition, although in the first and the second embodiments, DVD-Videos and BD-ROMs are given as exemplary recording media, other package media may also be used.

In addition, in the first and the second embodiments, the continuous reproduction unit is assumed as bitstreams that are seamlessly connected or bitstreams that are structured for allowing multi-angle reproduction. However, the reproduction unit may also be bitstreams other than these. For example, all the bitstreams recorded on the recording medium may also be assumed as the continuous reproduction unit.

In addition, each of the function blocks shown in FIG. 1, FIG. 5, and FIG. 6 may also be realized as a Large Scale Integration (LSI) that is an integrated circuit. The LSI may also be made into a single chip in the multiplexing apparatus 100, or the reproducing apparatuses 200 or 200a, and may also be made into plural chips (for example, function blocks other than a memory may also be made into a single chip). Although the LSI is assumed here, there are cases where the function blocks are also referred to as IC, System LSI, Super LSI, and Ultra LSI, according to the difference in integration degree.

In addition, the technique for implementing the integrated circuit is not limited to the LSI, but may also be realized in a dedicated communication circuit or a general-purpose processor. After manufacturing the LSI, it is also possible to use a Field Programmable Gate Array (FPGA) which allows programming, or a reconfigurable processor which allows reconfiguration of the connections and settings of circuit cells within the LSI.

Furthermore, when any integrated circuit technology to replace LSI appears as a result of development of semiconductor technology or other different technologies, the integration of function blocks may naturally be performed using the technology. The adaptation of biotechnology or the like is one of the possibilities.

In addition, each of the function blocks shown in FIG. 1, FIG. 5, and FIG. 6, and the core parts of the process operations shown in FIG. 4 and FIG. 7 may be implemented by a processor and a program.

INDUSTRIAL APPLICABILITY

With the multiplexing apparatus, the multiplexing method, the recording medium, the reproducing apparatus, and the reproduction method according to the present invention, since the color spaces of moving pictures to be reproduced are determined (fixed) to be of only one type, for example, within a predetermined unit such as a continuous reproduction unit, the frequent switching of color conversion methods that is caused by switching of color space definitions can be eliminated. As a result, effects are produced which alleviate the processing load on an apparatus for reproducing package media in which moving picture sequences having different color spaces are recorded on an identical media, and eliminate discomfort about subjective image quality, which is caused by switching of color space definitions. Therefore, the present invention can be applied to, for example, a video camera, a video reproducing apparatus, a cellular phone, and a personal computer.

The invention claimed is:

1. A multiplexing method for generating bitstreams by coding a moving picture on a basis of a constituent unit of the moving picture, and packet-multiplexing the bitstreams, said multiplexing method comprising:
   judging whether or not the constituent unit to be coded should be coded as part of a continuous reproduction unit in which bitstreams are structured so as to allow continuous reproduction;
   determining, for the constituent unit to be coded, a color space that is common within the continuous reproduction unit, when it is judged that the constituent unit to be coded should be coded as part of the continuous reproduction unit;
   generating bitstreams by coding the constituent unit to be coded according to the determined color space; and
   packet-multiplexing the bitstreams,
   wherein in said generating bitstreams, when a color space of the constituent unit to be coded is different from the determined color space, (i) the color space of the constituent unit to be coded is converted into the determined color space, (ii) the constituent unit to be coded that is to be expressed in the converted color space is coded, and (iii) a flag indicating whether or not the color spaces of the bitstreams that have been packet-multiplexed are of only one type is generated.

2. The multiplexing method according to claim 1,
   wherein, in said judging whether or not the constituent unit to be coded should be coded as part of the continuous reproduction unit, the bitstreams that are seamlessly connected are treated as the continuous reproduction unit.

3. The multiplexing method according to claim 1,
   wherein, in said judging whether or not the constituent unit to be coded should be coded as part of the continuous reproduction unit, the bitstreams that are structured so as to allow multi-angle reproduction are treated as the continuous reproduction unit.

4. The multiplexing method according to claim 1, further comprising:
   generating control information which indicates each of the bitstreams making up the continuous reproduction unit.

5. The multiplexing method according to claim 4, further comprising
   recording, on a recording medium, the bitstreams that have been packet-multiplexed.

6. The multiplexing method according to claim 4, further comprising
   recording, on a recording medium, the bitstreams that have been packet-multiplexed,
   wherein, in said generating a flag, a flag is generated, the flag indicating whether or not the color spaces of all the bitstreams recorded on the recording medium are narrow color-gamut spaces only.

7. A non-transitory recording medium on which bitstreams representing a coded moving picture are recorded,
   wherein a continuous reproduction unit, a discontinuous bitstream, and a flag are recorded on said recording medium, the continuous reproduction unit being made up of bitstreams that are structured so as to allow continuous reproduction, the discontinuous bitstream being a bitstream that is not included in the continuous reproduction unit, and the flag indicating whether or not color spaces of all the bitstreams recorded on said recording medium are of only one type, and
   color spaces are uniform within the continuous reproduction unit.

8. The recording medium according to claim 7,
   wherein the flag indicates whether or not the color spaces of all the bitstreams recorded on said recording medium are narrow-gamut spaces only.

9. A reproduction method of reading out bitstreams representing a coded moving picture from a recording medium on which the bitstreams are recorded, so as to reproduce the moving picture,
   wherein a continuous reproduction unit, a discontinuous bitstream, and a flag are recorded on the recording medium, the continuous reproduction unit being made up of bitstreams that are structured so as to allow continuous reproduction, the discontinuous bitstream being a bitstream that is not included in the continuous reproduction unit, and the flag indicating whether or not color spaces of the bitstreams recorded on the recording medium are uniform, and
   said reproduction method comprises:
   generating a decoded moving picture by decoding the bitstreams;
   reading out the flag from the recording medium and identifying a color conversion parameter to be applied to the decoded moving picture; and
   converting a color format of the decoded moving picture by applying the identified color conversion parameter to the decoded moving picture,
   wherein when identifying the color conversion parameter:
   a color conversion parameter appropriate for one of a bitstream initially decoded within the continuous reproduction unit and the discontinuous bitstream is identified from information included in one of the bitstream initially decoded and the discontinuous bitstream, when the decoded moving picture is decoded from one of the bitstream initially decoded and the discontinuous bitstream; and
   a color conversion parameter that is common within the continuous reproduction unit is identified without identifying a color conversion parameter appropriate for a bitstream which is within the continuous reproduction unit and other than the bitstream initially decoded, when the decoded moving picture is decoded from the bitstream which is within the continuous reproduction unit and other than the bitstream initially decoded.

10. A multiplexing apparatus which generates bitstreams by coding a moving picture on a basis of a constituent unit of the moving picture, said multiplexing apparatus comprising:
   a judging unit operable to judge whether or not the constituent unit to be coded should be coded as part of a continuous reproduction unit in which bitstreams are structured so as to allow continuous reproduction;
   a color space determining unit operable to determine, for the constituent unit to be coded, a color space that is common within the continuous reproduction unit, when said judging unit judges that the constituent unit to be coded should be coded as part of the continuous reproduction unit;
   a coding unit operable to generate bitstreams by coding the constituent unit to be coded according to the determined color space; and
   a multiplexing unit operable to packet-multiplex the bitstreams,
   wherein said coding unit is operable to, when a color space of the constituent unit to be coded is different from the determined color space, (i) convert, into the determined color space, the color space of the constituent unit to be coded, (ii) code the constituent unit to be coded that is to be expressed in the converted color space, and (iii) generate a flag indicating whether or not the color spaces of the bitstreams that have been packet-multiplexed are of only one type.

11. A recording apparatus which generates bitstreams by coding a moving picture on a basis of a constituent unit of the moving picture, and records the bitstreams on a recording medium, said recording apparatus comprising:

a judging unit operable to judge whether or not the constituent unit to be coded should be coded as part of a continuous reproduction unit in which bitstreams are structured so as to allow continuous reproduction;

a color space determining unit operable to determine, for the constituent unit to be coded, a color space that is common within the continuous reproduction unit, when said judging unit judges that the constituent unit to be coded should be coded as part of the continuous reproduction unit;

a coding unit operable to generate bitstreams by coding the constituent unit to be coded according to the determined color space;

a multiplexing unit operable to packet-multiplex the bitstreams; and a recording unit operable to record the bitstreams that are packet-multiplexed by said multiplexing unit on a recording medium, wherein said coding unit is operable to, when a color space of the constituent unit to be coded is different from the determined color space, (i) convert, into the determined color space, the color space of the constituent unit to be coded, (ii) code the constituent unit to be coded that is to be expressed in the converted color space, and (iii) generate a flag indicating whether or not the color spaces of the bitstreams that have been packet-multiplexed are of only one type.

12. A reproducing apparatus which reads out bitstreams representing a coded moving picture from a recording medium on which the bitstreams are recorded, so as to reproduce the moving picture, wherein a continuous reproduction unit, a discontinuous bitstream, and a flag are recorded on the recording medium, the continuous reproduction unit being made up of bitstreams that are structured so as to allow continuous reproduction, the discontinuous bitstream being a bitstream not included in the continuous reproduction unit, and the flag indicating whether or not color spaces of the bitstreams recorded on the recording medium are uniform, and said reproducing apparatus comprises:

a decoding unit operable to generate a decoded moving picture by decoding the bitstreams;

a reading unit operable to read out the flag from the recording medium and identify a color conversion parameter to be applied to the decoded moving picture; and a color conversion unit operable to convert a color format of the decoded moving picture by applying the identified color conversion parameter to the decoded moving picture, wherein when the color conversion parameter is identified:

a color conversion parameter appropriate for one of a bitstream initially decoded within the continuous reproduction unit and the discontinuous bitstream is identified from information included in one of the bitstream initially decoded and the discontinuous bitstream, when the decoded moving picture is decoded from one of the bitstream initially decoded and the discontinuous bitstream; and a color conversion parameter that is common within the continuous reproduction unit is identified without identifying a color conversion parameter appropriate for the bitstream which is within the continuous reproduction unit and other than the bitstream initially decoded, when the decoded moving picture is decoded from the bitstream which is within the continuous reproduction unit and other than the bitstream initially decoded.

13. A non-transitory computer-readable medium having a program recorded thereon for generating bitstreams by coding a moving picture on a basis of a constituent unit of the moving picture, and packet-multiplex the bitstreams, the program causing a computer to execute:

judging whether or not the constituent unit to be coded should be coded as part of a continuous reproduction unit in which bitstreams are structured so as to allow continuous reproduction;

determining, for the constituent unit to be coded, a color space that is common within the continuous reproduction unit, when it is judged that the constituent unit to be coded should be coded as part of the continuous reproduction unit;

generating bitstreams by coding the constituent unit to be coded according to the determined color space; and packet-multiplexing the bitstreams, wherein in the generating bitstreams, when a color space of the constituent unit to be coded is different from the determined color space, (i) the color space of the constituent unit to be coded is converted into the determined color space, (ii) the constituent unit to be coded that is to be expressed in the converted color space is coded, and (iii) a flag indicating whether or not the color spaces of the bitstreams that have been packet-multiplexed are of only one type is generated.

14. A non-transitory computer-readable medium having a program recorded thereon for reading out bitstreams representing a coded moving picture from a recording medium on which the bitstreams are recorded, so as to reproduce the moving picture, wherein a continuous reproduction unit, a discontinuous bitstream, and a flag are recorded on the recording medium, the continuous reproduction unit being made up of bitstreams structured so as to allow continuous reproduction, the discontinuous bitstream being a bitstream not included in the continuous reproduction unit, and the flag indicating whether or not color spaces of the bitstreams recorded on the recording medium are uniform, and the program causes a computer to execute:

generating a decoded moving picture by decoding the bitstreams;

reading out the flag from the recording medium and identifying a color conversion parameter to be applied to the decoded moving picture; and converting a color format of the decoded moving picture by applying the identified color conversion parameter to the decoded moving picture, wherein when identifying the color conversion parameter:

a color conversion parameter appropriate for one of a bitstream initially decoded within the continuous reproduction unit and the discontinuous bitstream is identified from information included in one of the bitstream initially decoded and the discontinuous bitstream, when the decoded moving picture is decoded from one of the bitstream initially decoded and the discontinuous bitstream; and a color conversion parameter that is common within the continuous reproduction unit is identified without identifying a color conversion parameter appropriate for a bitstream which is within the continuous reproduction unit and other than the bitstream initially decoded, when the decoded moving picture is decoded from the bitstream which is within the continuous reproduction unit and other than the bitstream initially decoded.

15. An integrated circuit which generates bitstreams by coding a moving picture on a basis of a constituent unit of the moving picture, and packet-multiplexing the bitstreams, said integrated circuit comprising:

a judging unit operable to judge whether or not the constituent unit to be coded should be coded as part of the continuous reproduction unit in which bitstreams are structured so as to allow continuous reproduction;

a color space determining unit operable to determine, for the constituent unit to be coded, a color space that is common within the continuous reproduction unit when said judging unit judges that the constituent unit to be coded should be coded as part of the continuous reproduction unit;

a coding unit operable to generate bitstreams by coding the constituent unit to be coded according to the determined color space; and a multiplexing unit operable to packet-multiplex the bitstreams, wherein said coding unit is operable to, when a color space of the constituent unit to be coded is different from the determined color space, (i) convert, into the determined color space, the color space of the constituent unit to be coded, (ii) code the constituent unit to be coded that is to be expressed in the converted color space, and (iii) generate a flag indicating whether or not the color spaces of the bitstreams that have been packet-multiplexed are of only one type.

16. An integrated circuit which reads out bitstreams representing a coded moving picture from a recording medium on which the bitstreams are recoded, so as to reproduce the moving picture, wherein a continuous reproduction unit, a discontinuous bitstream, and a flag are recorded on the recording medium, the continuous reproduction unit being made up of bitstreams that are structured so as to allow continuous reproduction, the discontinuous bitstream being a bitstream not included in the continuous reproduction unit, and the flag indicating whether or not color spaces of the bitstreams recorded on the recording medium are uniform, and said integrated circuit comprises:

a decoding unit operable to generate a decoded moving picture by decoding the bitstreams;

a reading unit operable to read out the flag from the recording medium and identify a color conversion parameter to be applied to the decoded moving picture; and a color conversion unit operable to convert a color format of the decoded moving picture by applying the identified color conversion parameter to the decoded moving picture, wherein when the color conversion parameter is identified:

a color conversion parameter appropriate for one of a bitstream initially decoded within the continuous reproduction unit and the discontinuous bitstream is identified from information included in one of the bitstream initially decoded and the discontinuous bitstream, when the decoded moving picture is decoded from one of the bitstream initially decoded and the discontinuous bitstream; and a color conversion parameter that is common within the continuous reproduction unit is identified without identifying a color conversion parameter appropriate for the bitstream which is within the continuous reproduction unit and other than the bitstream initially decoded, when the decoded moving picture is decoded from the bitstream which is within the continuous reproduction unit and other than the bitstream initially decoded.

\* \* \* \* \*